United States Patent [19]
Kuhns

[11] Patent Number: 5,143,023
[45] Date of Patent: Sep. 1, 1992

[54] ANIMAL LITTER WITH CHEMICALLY BOUND CHEMICAL INDICATORS

[75] Inventor: Charles R. Kuhns, Pharr, Tex.

[73] Assignee: KleanHeart, Inc., Austin, Tex.

[21] Appl. No.: 598,102

[22] Filed: Oct. 16, 1990

[51] Int. Cl.$^5$ .............................................. A01K 1/015
[52] U.S. Cl. ..................................... 119/173; 119/171
[58] Field of Search ............... 119/169, 170, 171, 172, 119/173

[56] References Cited

U.S. PATENT DOCUMENTS

| | | | |
|---|---|---|---|
| 3,059,615 | 10/1962 | Kuceski et al. | 119/1 |
| 3,978,818 | 9/1976 | Heldenbrand | 119/1 |
| 4,020,156 | 4/1977 | Murray et al. | 424/76 |
| 4,315,761 | 2/1982 | Larrson et al. | 71/21 |
| 4,458,629 | 7/1984 | Gerber | 119/172 |
| 4,591,581 | 5/1986 | Crampton et al. | 119/173 |
| 4,638,763 | 1/1987 | Greenberg | 119/1 |
| 4,685,420 | 8/1987 | Stuart | 119/1 |
| 5,000,115 | 3/1991 | Hughes | 119/173 |

FOREIGN PATENT DOCUMENTS

| | | | |
|---|---|---|---|
| 2902079 | 11/1979 | Fed. Rep. of Germany | 119/171 |
| 3644826 | 7/1987 | Fed. Rep. of Germany | 119/171 |
| 120926 | 6/1985 | Japan | 119/171 |
| 219323 | 9/1988 | Japan | 119/171 |
| 2-069123 | 3/1990 | Japan | 119/171 |

*Primary Examiner*—John G. Weiss
*Attorney, Agent, or Firm*—David L. Mossman

[57] ABSTRACT

A litter for the accumulation of animal urine, such as a domestic cat litter, having at least one visual indicator chemically bound to the litter base material, and a method for making such litter have been discovered. The litter having the chemical indicator chemically absorbed thereon, rather than merely physically absorbed, permits the litter to be used not only as an effective mechanism by animal owners to determine potential health concerns with their animals; but because the indicator is chemically bound, the same litter may also serve as a useful diagnostic tool in a subsequent visit to a veterinarian. The litter base material must have the ability to exchange ions. Compounds to facilitate agglomeration or clumping of the litter when contacting urine may also be added to the litter base material.

38 Claims, No Drawings

5,143,023

ANIMAL LITTER WITH CHEMICALLY BOUND CHEMICAL INDICATORS

FIELD OF THE INVENTION

The invention relates to animal litters for accumulating animal urine, and more particularly relates, in one embodiment, to animal litters having chemical indicators incorporated therein.

BACKGROUND OF THE INVENTION

Animal litters, such as those used in containers placed in designated sanitary areas, cages, exercise areas and the like for animals such as pets, e.g. cats, dogs, birds, guinea pigs, rabbits, mice, gerbils, monkeys, reptiles, poultry, etc. are well known in the art. These litters are generally used to accept the excrement, urine and feces, of the animals, in lieu of the animals relieving themselves out of doors for various reasons, including, but not limited to compliance with the leash laws, the safety of the animal, etc.

Litter materials have comprised a wide range of substances, including, but not limited to, dried grasses, e.g. hay, alfalfa or straw; husks; sawdust; corn cob grits; excelsior; wood shavings; cereal hulls; cotton; bark; lignocellulose; cellulose; ground sugar cane; shredded paper; cloth; silicates; sulfates; mineral compounds, e.g. porous inert solids such as clays, even burnt expanded clays; sand; particulate, absorbent organic polymers, such as polyethylene, polypropylene or polystyrene; and the like. It is also known to modify litters for various purposes, such as to reduce the odor of the animal excrement, or to cause agglomeration of the litter to facilitate its easy removal from the box, cage or the like to avoid waste by having to remove the unused litter along with the used litter requiring disposal. It is also known to provide chemical indicators in animal litters for a variety of purposes, such as to indicate the necessity of litter removal or to provide information about the health of the animal using the litter.

For example, U.S. Pat. No. 3,059,615 teaches an acidified cellulosic litter with a pH of substantially 2.5 to 3.5 and a neutralization capacity of at least 2, where the neutralization capacity is based on attaining a pH of no higher than 6.5. The acidified litter is thus an indicator which changes color at the indicated pH to serve as a warning that it is time to change the litter. The acids and bases used are simply contacted with and physically absorbed into the cellulosic litter.

A litter package having a body of litter within a container of waterproof material for use by a pet after the package has been opened to expose the litter substantially throughout the area of the container when disposed for use is disclosed in U.S. Pat. No. 3,978,818. The litter body consists of particles of absorbent material or materials that are chemically neutral when wet. Testing means are associated with the litter and of an indicator type changing color if wetted by urine containing a color-changing reactant indicating an unfavorable health condition. The testing means may be incorporated in litter material, carried out on the inner surface of the container or on inserts when the package is open. The testing means includes at least one unitary portion under each position the animal may occupy while urinating and of an area such as to become wetted at least in part by contact with urine-wetted particles in the normal use thereof thus to be subject to the reactant throughout a predetermined time. The indicating means may include different types of indicators, each changing color in response to different reactants, the colors being different for each reactant. Again, the indicators are simply sprayed onto and are physically absorbed by the shredded paper litter used.

U.S. Pat. No. 4,020,156 describes fragrance releasing crystal beads that gradually release a fragrance under anhydrous conditions and provide a rapid release of fragrance when wetted. The beads comprise a water-soluble particulate carrier, e.g. prilled urea, coated with a finely divided highly absorptive inorganic matrix containing the fragrance. The beads optionally include emollients and bacteriostats and the like and can be used for pleasingly perfumed sachets or as bath beads or as agents for the control of malodors in pet litter. The particulate beads may be conspicuously colored such that their color substantially disappears as they are dissolved, giving a visual indication of the need for replenishment.

The use of a finely divided calcium hydrosilicate material, in particular aerated or foamed concrete, as a substance for binding and clearing of urine and excrements of the kind excreted by pets is mentioned in U.S. Pat. No. 4,315,761. The material gives rapid and effective drying of the excrements, which, particularly if the material is combined with gypsum as a bond-improving agent, becomes extremely easy to remove or clear. The calcium hydrosilicate and the gypsum are simply mechanically mixed together.

U.S. Pat. No. 4,638,763 teaches the use of anhydrous sodium sulfate as an additive to animal litters formed from mineral, cellulosic, or chlorophyll-containing base materials. The amount of anhydrous sodium sulfate added is from approximately 0.5 to 4 parts for each 100 parts of the base material of the litter formulation. Additionally, an additive composition can include approximately 1 part citric acid for each 10 parts, by weight, of anhydrous sodium sulfate, approximately 1 part sodium chloride for each part of citric acid, by weight, and smaller amounts of activated carbon granules and germicidal agents. Again, the components are simply physically mixed. The additive upon absorbing the urine apparently forms a deposit of sufficient size and strength to be removed by a sieving spoon along with the feces or urine.

Finally, an animal litter comprising a porous, inert solid substrate and a dry particulate polymer is mentioned in U.S. Pat. No. 4,685,420. When animal urine contacts the animal litter there are produced gelled agglomerates containing the animal urine, polymer and solid substrate. The gelled agglomerates have sufficient mechanical integrity to be conveyed as discrete entities thereby permitting animal urine to be physically removed from a litter box containing the animal litter of the '420 patent invention. Suitable polymers include, but are not limited to polymers of acrylic acid, methacrylic acid, and alkali metal salts thereof.

An unresolved problem with animal litters containing physically absorbed chemical indicators that are used to provide a visual indication of an animal's health is that once the reaction occurs and the color is produced, prompting action on the part of the animal owner, the veterinarian cannot regenerate the color from the litter to be useful as a diagnostic tool. The veterinarian thus must rely on the sometimes inaccurate recollection of the owner, or must express urine from the animal in question in a sometimes unsuccessful attempt to recreate the visual indication.

SUMMARY OF THE INVENTION

Accordingly, it is an object of the present invention to provide an animal litter that has visual chemical indicators chemically bound to the base material of the litter.

It is another object of the present invention to provide an animal litter having visual chemical indicators physically bound thereto where the strength of the reaction may be adjusted to permit a veterinarian to determine a chemical reaction within a fairly narrow range of the indicating characteristic, for example pH, while the reaction may be styled over a wider range for the more general use of the consumer.

It is yet another object of the invention to provide an animal litter which may have more than one indicator chemically bound thereto so that a variety of conditions might be detected.

In carrying out these and other objects of the invention, there is provided, in one form, a litter for the accumulation of animal urine, the improvement comprising a base material having the ability to exchange ions, and an effective amount of at least one chemical compound combined with the base material, where the chemical compound may be (1) at least one chemical indicator which is free to react to provide a visual indication; (2) at least one binding agent which is free to react to agglomerate with surrounding base material upon contact with a polyelectrolyte; and (3) mixtures thereof.

DETAILED DESCRIPTION OF THE INVENTION

Problem Statement:
The Need for Reliable, Non-invasive Urinanalysis for Felines

A method has been discovered for successfully binding certain indicating molecules in such a manner as to leave functionary reactive sites available to react with desired substances and/or ions. The desired reacting substances may be the products of metabolism, infection or other biochemical and physiological reactions. This is sometimes accomplished by binding and shifting the dipole moment of the attracted particle or substance and thereby creating a color reaction which is readily and easily discerned.

More specifically, in felines, genitourinary infections are difficult problems to treat because of an approximately 32% recurrence rate. Whether the infection site be renal, ureter, bladder or urethral, the causative organisms are usually the same. Many of these infective species are urease-producing and urea-splitting bacteria. These metabolic compounds, of course, raise the pH of the urine, indicating an increasing population of infective organisms. The situation can be further exacerbated by the formation of uroliths (stones) in the bladder or urethra at basic or alkaline pH. Further, the bacteria, their detritus and mucus can serve as nucleating foci for "stone" or struvite crystal growth. The composition may be termed a magnesium ammonium phosphate complex.

Poor quality diet will also elevate the pH of cat urine. A diet deficient in sulfur-bearing amino acids is thought to promote basic or alkaline pH urine in cats. It has been shown that by feeding a methionine amino acid supplement, a cat's urine pH can be reduced to the more desirable acid pH. Also, it has been proven that by acidifying the urine of the cat with methionine or ammonium chloride that dissolution of stones and crystals of the magnesium ammonium phosphate type may be effected. Acid urine in the cat also is bacteriostatic to many of the infective bacteria. Additionally, it is difficult to monitor the pH of a cat's urine without resorting to cathertization, general anesthesia or centesis.

Urinary system problems in cats has been generally termed Feline Urologic Syndrome (FUS), and have been stated to be responsible for 10% of cat owners' visits to veterinary hospitals. FUS generally implies that more than one ailment is present, such as an obstructed urethra and an infection of the bladder, for example. An obstructed or plugged urethra that occurs without other complicating conditions is known as urolithiasis. An infected bladder occurring without other complicating conditions is known as cystitis. Since more urinary problems in the feline are usually a multiple of conditions, the term FUS has come into common usage.

GENERAL DESCRIPTION OF THE INVENTION

By using certain reactive clays and minerals, such as attapulgite, bentonite, montmorillonite, kaolin, halloysite, vermiculite, Fuller's earth, sepiolite, zeolites and even manufactured organic polymer ion-exchange resins and mixtures thereof and treating them by the methods of the invention, it is possible to bind pH-indicating molecules to the clays or polymers while leaving the pH-sensitive reactive groups available to indicate hydrogen ion, hydroxyl ion and other cationic and anionic ions. In one embodiment, the litter medium indicates a pH in the range from about 5 to about 9.5, with a sensitivity up to 0.25 pH unit, if necessary. It will be appreciated that although pH-indicating molecules may be the most desirable indicators to bind to the base materials, indicators of other conditions are also anticipated as being useful to bind to the base substrate(s).

Some of the clays mentioned are currently available as animal litters, but lack the pH-indicating capability of the present invention.

A further novel feature of the present invention is the formation of a plastic mass or ball of litter which has been hydrated by the water of the animal's urine, yielding a "urine ball" which has sufficient strength, plasticity and structural integrity to be lifted in its entirety from the bed of animal litter.

This hydrated "ball" or mass of litter is made possible by careful control of particle size, hygroscopic water or water of hydration in the colloid particle, zeolitic water, hydroxyl water, balance of internal lattice charges, hydrogen bonding in some cases, and molecular attraction through van der Waal forces.

This hydrated mass contains all the urine, bacteria, products of infection, protein, salts, odors or odor causers and can be lifted out of the litter box and disposed of in an appropriate manner, such as flushing down a toilet stool. This feature of the invention promotes better hygiene, less odor and, most importantly, aids in the prevention of disease transmission to other cats using the same litter box, as well as possible animal-to-man diseases.

Thus, in the practice and use of the invention, the pet owner or veterinarian can note the color of the urine mass, be able to determine several and perhaps critical physiological indications. Obviously, the litter container would need to bear instructions on how to interpret the colors that may appear. Additionally, the pet owners would need to remember that the indications that they observe are only very preliminary and should be followed up by a professional veterinarian. Indeed, the home use of the inventive product would not replace professional diagnosis, but would simply be a tool for discovering early if veterinary counsel should be sought. The mass can immediately be lifted out of the litter container and disposed of to realize the benefits of better hygiene mentioned above. Because the chemical indicators are chemically bound to the litter base material, it is even possible for a veterinarian to quickly regenerate the color of a litter mass brought by a pet owner, through chemical means in the lab. In this way, the veterinarian may observe first-hand the indicator reaction. This feature is not possible with litters where the indicators are merely physically absorbed on the litter base material, since insufficient quantities of the reactants may remain after one use.

In another embodiment of the invention, the chemical indicating litter may be designed specifically for veterinarian use in that the litter might be particularly sensitive to certain symptom indications, or might possess a narrower window of reactivity to enable the veterinarian to more precisely determine the chemical or by-product being detected. Such litters would be expected to be more costly to manufacture and thus prohibitive for the general consumer market. These litters for veterinarian use might be termed "diagnostic colormetric litter". In another embodiment, the veterinarian might give a particular specialized litter to a pet owner with instructions for observing reactions at home.

The invention provides a quick, easy and reliable method for monitoring urine pH, preventing cystitis, and aiding the treatment of urolithiasis and FUS. The chemical indicating litter also facilitates changing the litter box.

MORE SPECIFIC DESCRIPTION OF THE INVENTION

While manufactured organic ion-exchange resins are expected to be useful as the litter base materials of this invention, in one embodiment it is expected that naturally occurring clays with ion-exchange capability will be preferred due to their generally lower cost. Generally preferred clay substrates or base materials include, but are not necessarily limited to, montmorillonite clays, bentonite clays, Fuller's earth, kaolin clays, sepiolite clays, zeolites, attapulgite clays and mixtures thereof. Also expected to be suitable are halloysite and vermiculite materials.

While these clays are generally useful, a particular clay must be carefully selected for use as a litter base material. This analysis of the clay is the first step in the litter preparation process. Attapulgite will be used as an example, although the other clays mentioned may be understood to be generally suitable as well.

The desired mesh size ranges from about 6 to about 200 mesh, and preferably from about 30 to 60 mesh. Some fines smaller than these lower limits are tolerable if they do not exceed about 3% of the total.

The cation exchange capacity (CEC) must also be determined, as well as the predominant ion. This is accomplished, in one embodiment, by making a 2% slurry of the clay in water of at least 2 million ohm purity. The slurry is covered and permitted to hydrate for at least 48 hours. This hydration period will vary in length for the different clays. After the hydration period is complete, the clear water above the settled clay is decanted and divided into three equal portions. The pH of the first portion is taken and duly noted. The pH of the clay base material should range from about 5.5 to 9.5 in one embodiment of the present invention. The pH indicates the predominate ion. If the pH is higher than 7.0, then the predominant ion(s) is negative, such as $OH^-$, $Cl^-$, $CO_3^{--}$. If the pH is lower than 7.0, we know the predominant ion(s) is positive, such as $H^+$, $Mg^{++}$, $Al^{+++}$ or $Si^{++++}$, for example only. Since the chemical composition of the clays are well known, the exact predominant ion of a particular sample can be determined. In any event, well known qualitative analysis techniques may be employed.

In the same portion, the electromotive force (EMF) is determined by the EMF electrode of the pH meter. EMF indicates the net charge and the direction a current will flow, either positive or negative. As an example, a good attapulgite clay will have a pH of 7.5, and an EMF reading of $-050$ meq/100 g. or thereabout. This reading indicates that there is a small surplus of anions or negative charges. Preferably, in one embodiment, the net charge should range from about 0 to about 90 meq/100 g. in either polarity. Since it is attapulgite, the predominant ion is the $OH^-$ anion. Knowing the EMF and the predominant ion, the remaining two portions are diluted to 100 ml each and back-titrated, one portion with 0.001N NaOH, and the other portion with 0.001N HCl.

From the above data, the pH, CEC, dominant ion, and net charge are known. CEC is determined by dividing the net charge (number of surplus cations or anions) by the number of grams of clay used in the slurry sample. CEC may also be defined as ionic concentration or excess ion, i.e. a count of those ions that may be exchanged. In one embodiment of the invention, CEC should be within the range of about 0 to about 90 meq/g. and preferably in the range from about 0 to about 20 meq/g. It is also determined from the back-titrations and is a measure of exchangeable anions or cations derived from a known amount of clay.

Net charge and excess ion amounts are equivalents for the purpose of this invention, which is to reduce the charges of the clay particles, since it makes no difference whether the net charges are surface charges or edge charges. The charge density of the various clays in microcoulombs/$cm^2$ is well known and the net charge can be computed for a given amount of known clay. For example, montmorillonite can be found to have an exchange capacity of 70 to 100 milliequivalents (meq)/100 g. Exchange capacity (CEC) is the number of excess ions available to be exchanged. These excess ions can be of either positive or negative polarity.

Knowledge of these values is necessary because if the surplus charges in the clay are not neutralized they would bind the reactive sites on the indicators or other compounds chemically attached to the base material that should be free to react otherwise. For example, if the clay contained a surplus of $H^+$ ions and these were not neutralized, or at least a large majority neutralized (also called "conditioning" the clay) the $H^+$ ions would bind to the acid reactive site on the indicator and turn the clay yellow (or whatever indicating color), and acidity could not be detected. The same is true of $OH^-$ anions, if most of them were not neutralized or "conditioned", the clay would turn purple, and the basic indicating site would be bound, and thus, alkalinity in animal urine could not be detected. It is desirable for the clay to bind only the sulfonyl portion of the indicating molecule and not the wanted and/or desired reactive sites on the indicator.

At this point, the clay may be treated by various techniques to accomplish the optimum condition for subsequent treatment with the molecule that is desired to be chemically bound to the clay. It is also possible to put the "conditioning" materials in the binding solution which contains the indicating molecule to be bound.

The latter method is preferred because it eliminates a step in processing. However, the invention herein should not be limited to combining the conditioning and the binding of the indicator molecule in one step.

The conditioning ions can be any kind or number of cations, including, but not limited to, $H^+$, $Na^+$, $Ca^{++}$, $Mg^{++}$, $NH_4^+$, $Al^{+++}$, $Si^{++++}$ onium substituted ions (which may be cations or anions), and mixtures thereof. For anionic exchange, it has been found that phosphate and acetate anions are preferred, but again the invention is not limited to these as monovalent anions, since $Cl^-$ may also be useful.

In the present example, $H^+$ will be taken as a non-limiting example of the conditioning ion. The number or concentration of $H^+$ is critical to neutralize or bind the hydroxyl anions ($OH^-$) in the clay, leaving only sufficient $OH^-$ to bind the sulfono portions of the indicator molecules. Obviously, if the clay possesses predominantly cations, the conditioning ions must be anions, representative examples being given above.

In general, from about 80 to about 100% of the clay ions should be bound prior to (or simultaneous with) the reaction of the chemical indicators with the clay with either the conditioning ions or the indicators. Of course, as a practical matter, binding up all of the surplus clay ions is extremely difficult to achieve. In one embodiment of the invention, from about from about 95 to about 99% of the surplus clay ions should be conditioned or neutralized, leaving the balance to be bound by chemical indicators. In a more preferred embodiment, for a more sensitive litter, more of the excess clay ions should be bound leaving more sites for a greater proportion of indicator molecules, for example as many as 7% of the reactive sites. A more commercial, less expensive base material should have more of the clay ions bound (thus using less of the relatively more expensive indicators), for example only, from about 5 to about 0.0058% (a practical limit) of the clay ions bound to the chemical indicators.

In one embodiment of the invention, it is preferred that the chemical indicator contain at least one sulfono group ($SO_2^{++}$). The chemical indicator may include, but is not limited to, bromthymol blue (dibromothymolsulfonphthalein), phenol red (phenolsulfonphthalein), cresol red (o-cresolsulfonphthalein), bromcresol purple (dibromo-o-cresolsulfonphthalein), p-bromobenzenesulfonyl chloride, Congo red (diphenyldiazo-bis-1-naphthylamine-4-sodium sulfonate), methyl orange (4'-dimethylaminoazobenzene-4-sodium sulfonate) bromchlorphenol blue (dibromodichlorophenolsulfonphthalein), p-ethoxychrysoidine (4'-ethoxy-2,4-diaminoazobenzene), α-naphthyl red (α-naphthylaminoazobenzene), sodium alizarin-sulfonate (dihydroxyanthraquinone sodium sulfonate), bromcresol green (tetrabromo-m-cresolsulfonphthalein), 2,5-dinitrophenol, methyl red (4'-dimethylaminoazobenzene-2-carboxylic acid), lacmoid, litmus, chlorphenol red (dichlorophenolsulfonphthalein), benzoyl auramine G, azolitmin, bromphenol red (dibromophenolsulfonphthalein), dibromophenoltetrabromophenosulfonphthalein), p-nitrophenol, neutral red (2-methyl-3-amino-6-dimethylaminophenazine), rosolic acid aurin (corallin), quinoline blue (cyanine), α-naphthlolphthalein, metacresol purple (m-cresolsulfonphthalein), ethyl bis-[2,4-dinitrophenyl]acetate, tropaeolin OOO no. 1, (sodium α-naphthlolazobenzenesulfonate), thymol blue (thymolsulfonphthalein), o-cresolphthalein, phenolphthalein (3,3-bis-(p-hydroxyphenyl)phthalide), thymolphthalein, Nile blue A (aminonaphthodiethylaminophenoxazine sulfate) and mixtures thereof. It is important to realize that more than one chemical indicator may be bound to the litter so that more than one symptom indication, by-product, etc. may be tested for. Of course, care should be taken to insure that the indicators and their reactions do not interfere with each other or that confusing indications are not given to the consumer or the veterinarian. It can be expected that a veterinarian could interpret more simultaneous signals than the average pet owner. Thus, the number of indicators in consumer-directed litters might be limited to two, since a total of three possible colors might result (e.g. blue, red and the combination of the two as purple). Specialized veterinarian litters may possess a larger combination of indicators.

It is required that the indicator have at least one chemical group or substituent that may be chemically bound to the base material, while leaving the balance of the molecule free to react and provide the visual indication. It is not expected that the same portion of the molecule may serve both functions. It is preferred that the binding moiety and the indicating moiety also be somewhat removed from each other across the molecule. Otherwise, the indicating portion might be sterically hindered from reacting. It is especially preferred that the portion of the molecule to be bound to the litter substrate be sulfono ($SO_2^{++}$), which is common among chemical indicators, although the invention is not necessarily limited to this binding substituent.

EXAMPLE 1

Using the attapulgite clay mentioned above, 27.200 kg. of clay were conditioned with the $H^+$ ion and indicators of the following solution. The ingredients to make a w/v solution for the purpose of spraying into the mass of the clay while it was being mixed were:

Bromthymol blue—$C_{27}H_{28}Br_2O_5S$: 8.0 g.
Phenolsulfonphthalein—$C_{19}H_{14}O_5S$: 8.0 g.
Distilled water: 2.0 l.
Hydrochloric acid, HCl: Q.S.
quantum sufficit-enough to adjust pH to 3.0 to 5.0 depending upon CEC and $OH^-$ concentration.

The amount of conditioning agent, in this case HCl, is determined by placing a pH meter electrode in the mixing solution while a 25% v/v solution of HCl is added slowly with constant mixing. If the CEC is from about 3 to about 6, the pH is adjusted to about 5, if CEC is from between about 7 to about 12, the pH should be adjusted to about 4, if the CEC is in the range of about 13–18, the pH is adjusted to about 3. These parameters are valid regardless of the conditioning ion or conditioning solution. The ionic conditioning solution may have excess ion, but in one embodiment the excess ion should range from about 0 to about 90 meq/100 g.

There should be uniformity of coverage of the clay by the binding solution, i.e. the one containing the indicators. The solution is sprayed on in the form of a mist with droplet sizes of about 2 microns or less. The clay should be airborne when the droplet impinges on the clay particle. Known pharmaceutical processing equipment which will work reasonably well for this purpose include a tablet coating tub or a fluid bed coater, although others might be found or devised which will work as well.

Important considerations to be observed in the method of the invention include the following:

(1) Water Quantity

The amount or volume of water used is very important because it is also bound by the clay. The amount of water used depends upon whether the clay is a double layer or triple layer clay. Only the right amount is required to prevent swelling of the different multilayered clays. If too much water is added, the clay(s) will swell and not strongly bind the water. The amount of water varies from one type of clay to the next and cannot be specified in advance. Further, the optimum amount of water is important to provide ultimate wicking action of the animal's urine into the clay. This wicking action determines the speed of reaction or color change in actual use of the indicating clay litter.

By experimentation reported in the literature, the absorbency of the various clays is known, and it may also be determined by other experimentation. The absorbency varies with the different clays from about 3X to 10X of their dry weights. The water added in the method of this invention should not exceed about 10% of the dry weight of the clay. In chemical and pharmaceutical formulating, there is "wetness" and "apparent wetness". Apparent wetness is best described as a wet material that does not appear to be wet. To unaided senses it does not appear wet, it does not clump; it remains free flowing. By not exceeding the apparent wetness level for any particular clay, the litter of the invention does not have to be dried out in processing which avoids a costly step and the hazard of static charge in the drying step which would have a deleterious effect on the indicators. Further, by controlling the amount of water, clumping or caking of the litter in the package does not occur.

(2) Water Temperature

The temperature of the water during solvation of the indicators used in Example 1 must not exceed 50° C. or there will be too much energy put into the system and the indicators will be undesirably activated. This may vary from indicator to indicator or combinations thereof.

(3) Addition Sequence

In the use of bromthymol blue and phenol red together, it is critical to add the bromthymol blue to the water first to complete solution before adding the phenol red. If the order is reversed, precipitation will occur, and it is unfortunately irreversible. The importance of the sequence will, of course, depend on which combination of indicators is employed.

Other sources of $H^+$ may be used depending upon the final desired effect on the final litter, what anions are present in the clay, and whether alkylamines are present. Naturally-occurring alkylamines are not desirable, however, intentionally incorporated alkylamines may be useful in changing the pH trigger, for example from 7.0 to 6.7.

The litter of Example 1 is used as an "Early Warning System" for the average lay person/animal owner. If the pH of a cat's urine is at pH 7.5 or higher for several successive days and this is indicated by purple urine balls or clumps in the litter box, the cat owner is taught or knows that this is an abnormal condition even though their cat may not be exhibiting frank or overt signs of clinical illness. The cat owner can then take the cat to the veterinarian for a complete diagnosis and treatment. Thus, the cat owner may prevent a more costly treatment and aid the veterinarian in starting treatment earlier with a more assured successful resolution.

EXAMPLE 2

Assuming the clay is suitable as previously described, another example of indicating solution with which to bind to the clay is as outlined below. The clay of this Example 2 was attapulgite as well.

Bromthymol blue—$C_{27}H_{28}Br_2O_5S$: 8.0 g.
Dibromo-o-cresolsulfonphthalein—$C_{21}H_{16}Br_2O_5S$: 8.0 g.
Distilled water: 2.0 liters
Hydrochloric acid, $HCl$,: Q.S.
quantum sufficit—enough to adjust pH to 2.0 to 3.5 depending upon CEC and $OH^-$ concentration.

After this solution has been applied to the clay by suitable mechanical means, described previously, it is permitted to bind properly. Sodium montmorillonite clay is next added at the proportion of 7.5% of the original dry weight of the base material clay. For example, the two liters of the above solution will treat 27.272 kg. of clay, so 7.5% is 2.0454 kg of Na montmorillonite that is added. The Na montmorillonite is a 200 mesh dry material and is an aid in the clumping or agglomerization of the final litter product when it is in use. Being negatively charged, Na montmorillonite is a better aid for healthy acidic urine agglomerations than for alkaline urine. Na montmorillonite may also be added to the litter of Example 1.

Important considerations that must be observed in this particular formulation include:

(1) The amount of water used, as discussed in connection with Example 1.

(2) The bromthymol blue must be added first.

(3) The Na montmorillonite cannot be added until the indicators have been bound or it will interfere with the binding process by itself binding some of the indicators and affecting the pH at which the desired color change is made.

The litter of Example 2 is designed to yield a litter product which changes color from yellow to blue at pH of about 6.7 to 6.8.

The Example 2 litter will visually indicate pH from 5.2 to 6.8. This pH range is known as the Visual Transition Interval (VTI). Not coincidentally, this VTI is also considered as the desirable pH range of a healthy cat's urine. Also, this is the pH which will prevent the formation of uroliths (stones) of the predominant magnesium ammonium phosphate type. In the case of existing stones, veterinarians will, as a matter of therapeutic treatment, acidify a cat's urine pH to within this range to dissolve stones or reduce them sufficiently in diameter to permit their passage. The VTI of the litter of Example 1 was pH 5.0 to 7.5.

It should be understood that the VTI can be shifted, narrowed, broadened and made more sensitive by altering the technique and method by different indicators; different ratios of indicators, one to another; by changing ion sources; amounts of solvents; types of solvents; and types of clays.

Example 3 is provided to illustrate a clumping or agglomerating cat litter that exhibits superior clumping ability in the presence of a polyelectrolyte such as cat urine. Most existing clumping cat litters will do a sufficient job of clumping by using pure or potable water. Vendors demonstrating the clumping ability of their pet litters usually use plain water. Plain water will make a good clump with good mass integrity or "lift-out" strength. However, when normal cat urine is deposited on these same litters, the clumping characteristic of the litter is severely and adversely changed. The resulting clump is usually soft and crumbly, easily broken by the cat's "covering" activities, or by the act of scooping or lifting out the urine ball.

Various attempts have been made to correct this problem as cited in the Background portion of this patent application. U.S. Pat. No. 4,315,761 attempts to use mixtures of calcium hydrosilicate and gypsum to improve agglomerization; U.S. Pat. No. 4,638,763 uses a similar mechanical method, but with different substances. U.S. Pat. No. 4,685,420 uses synthetic polymers for the same purpose. A litter being sold under the name "Better Way" of Houston, Texas, sprays the clay particles with kerosene or No. 1 diesel fuel to attempt a hydrophobic colloidal suspension. While these prior methods work to some degree, they are often inconsistent, are costly, do not aid in odor control, or cannot be used with different types of clays.

At the interface of the solute (clay particles) and the solvent (cat urine) there is a microscopic colloidal system in the voids and intricacies of the urine clump. This colloidal system extends into the lattice of the clay crystal itself. More specifically, by addressing the electrochemical and van der Waal's forces involved in flocculation, peptization, protective colloids and stabilization, we can consistently control the integrity of the urine ball mass, regardless of urine volume, pH or urine salts.

Suitable binding agents useful for this portion of the invention include, but are not limited to, sodium hydroxide, sodium polymetaphosphate, sodium bicarbonate, potassium hydroxide, calcium hydroxide, magnesium hydroxide, aluminum hydroxide and mixtures thereof. In one embodiment, the binding agent is present in a proportion from about 0.033 to about 1.5 wt. %, based on the proportion of dry base material.

The various embodiments of this invention also aid in controlling odor without the addition of a perfume, deodorants or other odormasking compounds. The three most offending odors of cat excrement are all aromatics, and are thus reactive and enter the colloidal suspension described above.

The simplest mechanism of odor control is simply physical, that is, the clumps are simply lifted out frequently and disposed of. As noted, a good, firm clump facilitates this, in that it does not crumble or sieve through the scoop to remain in the litter box. Chemically, ammonia combines with the water of the urine or surrounding air forming ammonium hydroxide, $NH_4OH$ (a basic salt), which is captured by the alkaline reactive sites of the system.

The characteristic odor of cat urine is also captured by the acid reactive sites of the system; this being the very pungent odor that tom cats use to mark their territorial boundaries. The final odor from solid waste are the by-products of hydrolysis in the cat's digestive system and are primarily the sulfides of partially digested Keratin (from skin, hair, feathers, etc.). Since most of the odoriferous materials are in the liquid portion of the stool, they are bound up in the "clumping" or agglomeration of the litter and enter in the flocculation of the cat litter.

EXAMPLE 3

In some clays, such as attapulgite, the edge charges are positive; and, furthermore, the clay has a low CEC of usually about 3 to 15. It is possible to reverse these charges by the judicious addition of alkali anions, such as from NaOH, sodium polymetaphosphate, or other di- and trivalent anions.

This effect is sometimes called "ion antagonism", and the net effect is the peptization of the particles of clay with negative charges presented on the edges and surfaces. When normally acidic cat urine and its rich supply of inorganic and organic salts are added, flocculation or a "salting out" happens and clumping occurs. This is further enhanced by the addition of 5 to 10% sodium montmorillonite as described previously. Thus, by using natural means of electrochemistry, colloid chemistry and van der Waal's forces, it is possible to make a superior clumping cat litter that forms good strong clumps in the presence of polyelectrolyte cat urine. A sample formula or example to be added to and mixed with an appropriate attapulgite clay includes:

NaOH (sodium hydroxide): 10.2 g.
Distilled water: 5.0 liters
Na montmorillonite: 5.11 kg.

PROCESSING INSTRUCTIONS

The NaOH is dissolved in 5l. of distilled water and sprayed onto 150 lbs. of normal attapulgite of mesh size range from 30 to 60. After mixing, for approximately 5 minutes, dry Na montmorillonite is added to the batch, and the entire batch is allowed to mix another 5 minutes. The above formula and instructions are typical, but can be adjusted to accommodate other clays, meshes and varying CECs. The result is an animal litter that readily agglomerates upon contact with urine giving masses or balls having sufficient integrity to be cleanly disposed of.

Clays, such as the base materials of this invention, are known to have ion exchange characteristics. Using the techniques of this invention, the indicators used will not run or leach with additional water or fluid used in the conditioning or binding steps. The indicators do not exhibit a chromatographic effect; that is, the indicator molecules will not migrate as in paper chromatography or gel electrophoresis. The indicators are permanently chemically bound; also the reactants, that is, the reacting compounds from the urine, are permanently bound to the indicator.

A comparative example would be a urine clump or a clump of the litter of this invention made with pure water (no conditioning agents present). When the water in the clump starts migrating to the surface and evaporating, a water soluble molecule that has been only physically absorbed will migrate to the surface with the migrating water and be left deposited on the surface or outer periphery of the clump or agglomerate, leaving the interior of the clump completely void of absorbed molecule. To a degree, the make-up and size of an unbound molecule can be determined to a degree by how far it will migrate onto a paper strip or an electrophoretic gel that a galvanic charge may be placed on. The chemical indicators of the present invention cannot migrate because they are chemically bound.

For example, a dried urine clump may be powdered, have water added to it, and all of the powder particles will show the original color. The indicating litter of the present invention may also be covered with water to complete hydration, the water may be poured off, and if the litter is dried without contaminating it, the litter will still indicate when dry.

Not only does the indicator stay bound to the clay, but the reactive sites of the indicator still bind the reactant. When a veterinarian receives a colorless piece of the clump, he can crush it into a powder, add a few drops of sterile water, and the litter will indicate the original pH it was indicating before it became dried out. The indicating molecules may be unbound or uncoupled by making a paste or a gel of the litter and putting a small galvanic polar charge on it. The indicating molecules will then uncouple and migrate in the direction of the current. Again, this is an example of electrophoresis and is proof that the molecules are chemically bound.

Determining what indicators and what proportions affect the transitional color change at what pH or other characteristic is a complex decision that cannot be specified with precision without also analyzing the clay and determining the sophistication of the person to analyze the results and the desired conditions to test for. In Example 1, the transitional color point was set at pH 7.5 because it is expected to be sold to the general cat owner and thus it should not indicate irregularities in the urinary system until the pH reaches 7.5. If the threshold pH is set higher, the cat may become seriously ill before the condition is detected and the benefit of the early warning property of the litter is lost. If the threshold is set lower, to 6.7 for example, veterinarians would be inundated with cat owners claiming their pets where ill when in reality the indication was marginal. In Example 1, yellow (acid) to purple (alkaline) is the transition.

As discussed, specialized litter sold to health care professionals may have the threshold set more precisely, e.g. at 6.7 as in Example 2, because the veterinarian might be trying to acidify the urine with urinary acidifiers to dissolve uroliths or stones with a more acid pH, and/or trying to keep the urine acid to enhance the bacteriostatic effect and potentiate, that is, make more potent, medications such as amoxicillin, sulfamethazine, etc. Thus, veterinarians would need the threshold set no higher than 6.7 to determine at what point treatment is effective. It is thus anticipated that the threshold indication points can be selected by manipulation of the above-described chemistries and techniques.

Many modifications may be made in the invention without departing from the spirit and scope thereof, which are defined only in the appended claims. For example, clays, combinations of clays, indicators, combinations of indicators, solvents, conditioning ions, etc. other than those explicitly mentioned, are nonetheless anticipated herein. Indicators for conditions not mentioned, e.g. other than those acid- or base-detectable, would also be expected to be useful.

I claim:

1. A litter for the accumulation of animal urine comprising a base material having the ability to exchange ions, and an effective amount of at least one chemical compound combined with the base material, where the chemical compound is selected from the group consisting of at least one chemical indicator which is free to react to provide a visual indication; at least one binding agent which is free to react to agglomerate with surrounding base material upon contact with a polyelectrolyte; and mixtures thereof.

2. The litter of claim 1 where the base material is a clay is selected from the group of clays consisting of montmorillonite clays, bentonite clays, Fuller's earth, kaolin clays, zeolites, attapulgite clays, sepiolite clays and mixtures thereof.

3. The litter of claim 1 where the base material is an organic polymer ion exchange resin.

4. The litter of claim 1 where the binding agent is present in a proportion from about 0.033 to about 1.5 wt. %.

5. A litter for the accumulation of animal urine comprising a base material having the ability to exchange ions, and an effective amount of at least one chemical compound combined with the base material, where the chemical compound is selected from the group consisting of at least one chemical indicator which is free to react to provide a visual indication; at least one binding agent which is free to react to agglomerate with surrounding base material upon contact with a polyelectrolyte; and mixtures thereof, where the chemical indicator is sensitive to pH and provides a visual indication upon change in pH.

6. The litter of claim 5 where the chemical indicator is selected from the group consisting of bromthymol blue (dibromothymolsulfonphthalein), phenol red (phenolsulfonphthalein), cresol red (o-cresolsulfonphthalein), bromcresol purple (dibromo-o-cresolsulfonphthalein), p-bromobenzenesulfonyl chloride, Congo red (diphenyl-diazobis-1-naphthyl-amine-4-sodium sulfonate), methyl orange (4'-dimethylaminoazobenzene-4-sodium sulfonate) bromchlorphenol blue (dibromodichlorophenol-sulfonphthalein), p-ethoxychrysoidine (4'-ethoxy-2,4-diaminoazobenzene), α-naphthyl red (α-naphthylaminoazobenzene), sodium alizarinsulfonate (dihydroxyanthraquinone sodium sulfonate), bromcresol green (tetrabromo-m-cresolsulfonphthalein), 2,5-dinitrophenol, methyl red (4'-dimethylaminoazobenzene-2-carboxylic acid), lacmoid, litmus, chlorphenol red (dichlorophenolsulfonphthalein), benzoyl auramine G, azolitmin, bromphenol red (dibromophenolsulfonphthalein), dibromophenoltetrabromophenolsulfonphthalein), p-nitrophenol, neutral red (2-methyl-3-amino-6-dimethylaminophenazine), rosolic acid aurin (corallin), quinoline blue (cyanine), α-naphtholphthalein, metacresol purple (m-cresolsulfonphthalein), ethyl bis-[2,4-dinitrophenyl]acetate, tropaeolin OOO no. 1, (sodium α-naphthlolazobenzenesulfonate), thymol blue (thymolsulfonphthalein), o-cresolphthalein, phenolphthalein (3,3-bis-(p-hydroxyphenyl)phthalide), thymolphthalein, Nile blue A (aminonaphthodiethylaminophenoxazine sulfate) and mixtures thereof.

7. A litter for the accumulation of animal urine comprising a base material having the ability to exchange ions, and an effective amount of at least one chemical compound combined with the base material, where the chemical compound is selected from the group consisting of at least one chemical indicator which is free to react to provide a visual indication; at least one binding agent which is free to react to agglomerate with surrounding base material upon contact with a polyelectrolyte; and mixtures thereof, where the chemical indicator contains at least one sulfono group.

8. A litter for the accumulation of animal urine comprising a base material having the ability to exchange ions, and an effective amount of at least one chemical compound combined with the base material, where the chemical compound is selected from the group consisting of at least one chemical indicator which is free to react to provide a visual indication; at least one binding agent which is free to react to agglomerate with surrounding base material upon contact with a polyelectrolyte; and mixtures thereof, where the binding agent is selected from the group consisting of sodium hydroxide, sodium polymetaphosphate, sodium bicarbonate, potassium hydroxide, calcium hydroxide, magnesium hydroxide, aluminum hydroxide and mixtures thereof.

9. A litter for the accumulation of animal urine, comprising
   a base material having the ability to exchange ions, selected from the group of clays consisting of montmorillonite clays, bentonite clays, Fuller's earth, kaolin clays, zeolites, attapulgite clays, sepiolite clays and mixtures thereof; and
   an effective amount of at least one binding agent which is free to react to agglomerate with surrounding base material upon contact with a polyelectrolyte, where the binding agent is selected from the group consisting of sodium hydroxide, sodium polymetaphosphate, sodium bicarbonate, potassium hydroxide, calcium hydroxide, magnesium hydroxide, aluminum hydroxide and mixtures thereof, where the binding agent is mixed together with the clay.

10. The litter of claim 9 where the binding agent is present in a proportion from about 0.033 to about 1.5 wt. % based on the amount of dry base material.

11. A litter for the accumulation of animal urine made by mixing together
    a base material having the ability to exchange ions, selected from the group of clays consisting of montmorillonite clays, bentonite clays, Fuller's earth, kaolin clays, zeolites, attapulgite clays, sepiolite clays and mixtures thereof;
    an effective amount of at least one binding agent which is free to react to agglomerate with surrounding base material upon contact with a polyelectrolyte, where the binding agent is selected from the group consisting of sodium hydroxide, sodium polymetaphosphate, sodium bicarbonate, potassium hydroxide, calcium hydroxide, magnesium hydroxide, aluminum hydroxide and mixtures thereof, where the binding agent ranges from about 0.033 to about 1.5 wt. % of the base material; and
    water.

12. A litter for the accumulation of animal urine comprising a base material having the ability to exchange ions, and an effective amount of at least one chemical indicator chemically bound to the base material which, though chemically bound, is free to react to provide a visual indication.

13. The litter of claim 12 where the base material is a clay is selected from the group of clays consisting of montmorillonite clays, bentonite clays, Fuller's earth, kaolin clays, zeolites, attapulgite clays, sepiolite clays and mixtures thereof.

14. The litter of claim 12 where the base material is an organic polymer ion exchange resin.

15. A litter for the accumulation of animal urine comprising a base material having the ability to exchange ions, and an effective amount of at least one chemical indicator chemically bound to the base material which, though chemically bound, is free to react to provide a visual indication, where the chemical indicator is sensitive to pH and provides a visual indication upon change in pH.

16. The litter of claim 15 where the chemical indicator is selected from the group consisting of bromthymol blue (dibromothymolsulfonphthalein), phenol red (phenolsulfonphthalein), cresol red (o-cresolsulfonphthalein), bromcresol purple (dibromo-o-cresolsulfonphthalein), p-bromobenzenesulfonyl chloride, Congo red (diphenyl-diazo-bis-1-naphthyl-amine-4-sodium sulfonate), methyl orange (4'-dimethylaminoazobenzene-4-sodium sulfonate) bromchlorphenol blue (dibromodichlorophenol-sulfonphthalein), p-ethoxychrysoidine (4'-ethoxy-2,4-diaminoazobenzene), α-naphthyl red (α-naphthylaminoazobenzene), sodium alizarinsulfonate (dihydroxyanthraquinone sodium sulfonate), bromcresol green (tetrabromo-m-cresolsulfonphthalein), 2,5-dinitrophenol, methyl red (4'-dimethylaminoazobenzene-2-carboxylic acid), lacmoid, litmus, chlorphenol red (dichlorophenolsulfonphthalein), benzoyl auramine G, azolitmin, bromphenol red (dibromophenolsulfonphthalein), dibromophenoltetrabromophenolsulfonphthalein), p-nitrophenol, neutral red (2-methyl-3-amino-6-dimethylaminophenazine), rosolic acid aurin (corallin), quinoline blue (cyanine), α-naphthlolphthalein, metacresol purple (m-cresolsulfonphthalein), ethyl bis-[2,4-dinitrophenyl]acetate, tropaeolin OOO no. 1, (sodium α-naphthlolazobenzenesulfonate), thymol blue (thymolsulfonphthalein), o-cresolphthalein, phenolphthalein (3,3-bis-(p-hydroxyphenyl)phthalide), thymolphthalein, Nile blue A (aminonaphthodiethylaminophenoxazine sulfate) and mixtures thereof.

17. A litter for the accumulation of animal urine comprising a base material having the ability to exchange ions, and an effective amount of at least one chemical indicator chemically bound to the base material which, though chemically bound, is free to react to provide a visual indication, where the chemical indicator contains at least one sulfono group.

18. A litter for the accumulation of animal urine comprising a base material having the ability to exchange ions, and an effective amount of at least one chemical indicator chemically bound to the base material which, though chemically bound, is free to react to provide a visual indication, where a binding agent is also present in the litter, where the binding agent is selected from the group consisting of sodium hydroxide, sodium polymetaphosphate, sodium bicarbonate, potassium hydroxide, calcium hydroxide, magnesium hydroxide, aluminum hydroxide and mixtures thereof.

19. A litter for the accumulation of animal urine made by the process comprising the steps of:
    selecting a suitable clay base material having the ability to exchange ions;
    conditioning the clay to enable a chemical compound to chemically bind thereto;
    chemically binding the chemical compound to the clay, where the bound chemical compound is free to react to provide a benefit selected from the group consisting of a visual indication, an agglomerization effect, and mixtures thereof.

20. The litter of claim 19 where the steps of conditioning the clay and chemically binding the chemical compound to the clay are accomplished simultaneously.

21. The litter of claim 19 where the clay is selected from the group of clays consisting of montmorillonite clays, bentonite clays, Fuller's earth, kaolin clays, zeolites, attapulgite clays, sepiolite clays and mixtures thereof.

22. A litter for the accumulation of animal urine made by the process comprising the steps of:
    selecting a suitable clay base material having the ability to exchange ions, where the selection of a suitable clay base material comprises determining the pH, the cation exchange capacity (CEC) and the dominant ion of the clay;

conditioning the clay to enable a chemical compound to chemically bind thereto; and chemically binding the chemical compound to the clay, where the bound chemical compound is free to react to provide a benefit selected from the group consisting of a visual indication, an agglomerization effect, and mixtures thereof.

23. The litter of claim 22 wherein a clay base material is determined to be suitable if:

the pH falls within the range of about 5.5 to about 9.5;

the CEC falls within the range of about 0 to about 90 meq/100 g; and the dominant ion is one from the group of ions consisting of $H^+$, $Na^+$, $Ca^{++}$, $Mg^{++}$, $NH_4^+$, $Al^{+++}$, $Si^{++++}$ cations; phosphate, acetate, chlorine anions; onium substituted ions, and mixtures thereof.

24. The litter of claim 23 where chemical binding of the chemical compound to the clay is accomplished by contacting a solution of the chemical compound with the clay base material, where the solution contains chemical compound ions to be exchanged with those of the clay.

25. A litter for the accumulation of animal urine made by the process comprising the steps of:

selecting a suitable clay base material having the ability to exchange ions;

conditioning the clay to enable a chemical compound to chemically bind thereto, where the conditioning of the clay comprises reacting an ionic solution of ions selected from the group consisting of $H^+$, $Na^+$, $Ca^{++}$, $NH_4^+$, $Al^{+++}$, $Si^{++++}$ cations; phosphate, acetate, chlorine anions; onium substituted ions; and mixtures thereof; with the clay base material; and chemically binding the chemical compound to the clay, where the bound chemical compound is free to react to provide a benefit selected from the group consisting of a visual indication, an agglomerization effect, and mixtures thereof.

26. A litter for the accumulation of animal urine made by the process comprising the steps of:

selecting a suitable clay base material having the ability to exchange ions;

conditioning the clay to enable a chemical compound to chemically bind thereto; and chemically binding the chemical compound to the clay, where the bound chemical compound is free to react to provide a benefit selected from the group consisting of a visual indication, an agglomerization effect, and mixtures thereof;

where the chemical compound is a chemical indicator sensitive to pH and provides a visual indication upon change in pH, and where the chemical indicator contains at least one sulfono group.

27. The litter of claim 26 where the chemical indicator is selected from the group consisting of bromthymol blue (dibromothymolsulfonphthalein), phenol red (phenolsulfonphthalein), cresol red (o-cresolsulfonphthalein), bromcresol purple (dibromo-o-cresolsulfonphthalein), p-bromobenzenesulfonyl chloride, Congo red (diphenyl-diazobis-1-naphthyl-amine-4-sodium sulfonate), methyl orange (4'-dimethylaminoazobenzene-4-sodium sulfonate) bromchlorphenol blue (dibromodichlorophenol-sulfonphthalein), p-ethoxychrysoidine (4'-ethoxy-2,4-diaminoazobenzene), α-naphthyl red (α-naphthylaminoazobenzene), sodium alizarinsulfonate (dihydroxyanthraquinone sodium sulfonate), bromcresol green (tetrabromo-m-cresolsulfonphthalein), 2,5-dinitrophenol, methyl red (4'-dimethylaminoazobenzene-2-carboxylic acid), lacmoid, litmus, chlorphenol red (dichlorophenolsulfonphthalein), benzoyl auramine G, azolitmin, bromphenol red (dibromophenolsulfonphthalein), dibromophenoltetrabromophenolsulfonphthalein), p-nitrophenol, neutral red (2-methyl-3-amino-6-dimethylaminophenazine), rosolic acid aurin (corallin), quinoline blue (cyanine), α-naphthlolphthalein, metacresol purple (m-cresolsulfonphthalein), ethyl bis-[2,4-dinitrophenyl]acetate, tropaeolin OOO no. 1, (sodium α-naphthlolazobenzenesulfonate), thymol blue (thymolsulfonphthalein), o-cresolphthalein, phenolphthalein (3,3-bis-(p-hydroxyphenyl)phthalide), thymolphthalein, Nile blue A (aminonaphthodiethylaminophenoxazine sulfate) and mixtures thereof.

28. A litter for the accumulation of animal urine made by the process comprising the steps of:

selecting a suitable clay base material having the ability to exchange ions;

conditioning the clay to enable a chemical compound to chemically bind thereto;

chemically binding the chemical compound to the clay, where the bound chemical compound is free to react to provide a benefit selected from the group consisting of a visual indication, an agglomerization effect, and mixtures thereof; and mixing an effective amount of a binding agent with the base material and the binding agent is selected from the group consisting of sodium hydroxide, sodium polymetaphosphate, sodium bicarbonate, potassium hydroxide, calcium hydroxide, magnesium hydroxide, aluminum hydroxide and mixtures thereof, where the binding agent which is free to react to agglomerate with surrounding base material upon contact with a polyelectrolyte.

29. The litter of claim 28 where the binding agent is present in a proportion from about 0.033 to about 1.5 wt. %, based on the dry base material.

30. A method for making a litter for the accumulation of animal urine comprising the steps of:

selecting a suitable clay base material having the ability to exchange ions;

conditioning the clay to enable a chemical compound to chemically bind thereto;

chemically binding the chemical compound to the clay, where the bound chemical compound is free to react to provide a benefit selected from the group consisting of a visual indication, an agglomerization effect, and mixtures thereof.

31. The method of claim 30 where the steps of conditioning the clay and chemically binding the chemical compound to the clay are accomplished simultaneously.

32. The method of claim 30 where the clay is selected from the group of clays consisting of montmorillonite clays, bentonite clays, Fuller's earth, kaolin clays, zeolites, attapulgite clays, sepiolite clays and mixtures thereof.

33. A method for making a litter for the accumulation of animal urine comprising the steps of:

selecting a suitable clay base material having the ability to exchange ions; where the selection of a suitable clay base material comprises determining the pH, the cation exchange capacity (CEC) and the dominant ion;

conditioning the clay to enable a chemical compound to chemically bind thereto; and chemically binding the chemical compound to the clay, where the bound chemical compound is free to react to provide a benefit selected from the group consisting of a visual indication, an agglomerization effect, and mixtures thereof.

34. The method of claim 33 wherein a clay base material is determined to be suitable if:

the pH falls within the range of about 5.5 to about 9.5;
the CEC falls within the range of about 0 to about 90 meq/100 g.; and
the dominant ion is one from the group of ions consisting of $H^+$, $Na^+$, $Ca^{++}$, $Mg^{++}$, $NH_4^+$, $Al^{+++}$, $Si^{++++}$ cations; and phosphate, acetate, chlorine anions; onium substituted ions, and mixtures thereof.

35. A method for making a litter for the accumulation of animal urine comprising the steps of:

selecting a suitable clay base material having the ability to exchange ions;
conditioning the clay to enable a chemical compound to chemically bind thereto; where the conditioning of the clay comprises reacting an ionic solution of ions selected from the group consisting of $H^+$, $Na^+$, $Ca^{++}$, $Mg^{++}$, $NH_4^+$, $Al^{+++}$, $Si^{+++}$ cations; phosphate, acetate, chlorine anions; onium substituted ions; and mixtures thereof; with the clay base material;
chemically binding the chemical compound to the clay, where the bound chemical compound is free to react to provide a benefit selected from the group consisting of a visual indication, an agglomerization effect, and mixtures thereof.

36. A method for making a litter for the accumulation of animal urine comprising the steps of:

selecting a suitable clay base material having the ability to exchange ions;
conditioning the clay to enable a chemical compound to chemically bind thereto; and
chemically binding the chemical compound to the clay, where the bound chemical compound is free to react to provide a benefit selected from the group consisting of a visual indication, an agglomerization effect, and mixtures thereof, where chemical binding of the chemical compound to the clay is accomplished by contacting a solution of the chemical compound with the clay base material, where the solution contains chemical compound ions to be exchanged with those of the clay.

37. A method for making a litter for the accumulation of animal urine comprising the steps of:

selecting a suitable clay base material having the ability to exchange ions;
conditioning the clay to enable a chemical compound to chemically bind thereto; and
chemically binding the chemical compound to the clay, where the bound chemical compound is free to react to provide a benefit selected from the group consisting of a visual indication, an agglomerization effect, and mixtures thereof;
where the chemical compound is a chemical indicator sensitive to pH and provides a visual indication upon change in pH, and where the chemical indicator contains at least one sulfono group.

38. The method of claim 37 where the chemical indicator is selected from the group consisting of bromthymol blue (dibromothymolsulfonphthalein), phenol red (phenolsulfonphthalein), cresol red (o-cresolsulfonphthalein), bromcresol purple (dibromo-o-cresolsulfonphthalein), p-bromobenzenesulfonyl chloride, Congo red (diphenyl-diazobis-1-naphthyl-amine-4-sodium sulfonate), methyl orange (4'-dimethylaminoazobenzene-4-sodium sulfonate) bromchlorphenol blue (dibromodichlorophenol-sulfonphthalein), p-ethoxychrysoidine (4'-ethoxy-2,4-diaminoazobenzene), α-naphthyl red (α-naphthylaminoazobenzene), sodium alizarinsulfonate (dihydroxyanthraquinone sodium sulfonate), bromcresol green (tetrabromo-m-cresolsulfonphthalein), 2,5-dinitrophenol, methyl red (4'-dimethylaminoazobenzene-2-carboxylic acid), lacmoid, litmus, chlorphenol red (dichlorophenolsulfonphthalein), benzoyl auramine G, azolitmin, bromphenol red (dibromophenolsulfonphthalein), dibromophenoltetrabromophenolsulfonphthalein), p-nitrophenol, neutral red (2-methyl-3-amino-6-dimethylaminophenazine), rosolic acid aurin (corallin), quinoline blue (cyanine), α-naphthlolphthalein, metacresol purple (m-cresolsulfonphthalein), ethyl bis-[2,4-dinitrophenyl]acetate, tropaeolin OOO no. 1, (sodium α-naphthlolazobenzenesulfonate), thymol blue (thymolsulfonphthalein), o-cresolphthalein, phenolphthalein (3,3-bis-(p-hydroxyphenyl)phthalide), thymolphthalein, Nile blue A (aminonaphthodiethylaminophenoxazine sulfate) and mixtures thereof.

* * * * *